(12) United States Patent
Chen et al.

(10) Patent No.: US 8,989,488 B2
(45) Date of Patent: *Mar. 24, 2015

(54) METHOD FOR ESTABLISHING AN EVALUATION STANDARD PARAMETER AND METHOD FOR EVALUATING THE QUALITY OF A DISPLAY IMAGE

(71) Applicant: Shenzhen China Star Optoelectronics Technology Co., Ltd., Shenzhen, Guangdong (CN)

(72) Inventors: Lixuan Chen, Shenzhen (CN); Chih-tsung Kang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 126 days.

This patent is subject to a terminal disclaimer.

(21) Appl. No.: 13/813,440

(22) PCT Filed: Jan. 16, 2013

(86) PCT No.: PCT/CN2013/070529
§ 371 (c)(1),
(2) Date: Jan. 31, 2013

(87) PCT Pub. No.: WO2014/107909
PCT Pub. Date: Jul. 17, 2014

(65) Prior Publication Data
US 2014/0198984 A1    Jul. 17, 2014

(30) Foreign Application Priority Data

Jan. 12, 2013  (CN) .......................... 2013 1 0013809

(51) Int. Cl.
*G06K 9/00* (2006.01)
*G06T 7/00* (2006.01)

(52) U.S. Cl.
CPC ....... *G06T 7/001* (2013.01); *G06T 2207/10024* (2013.01); *G06T 2207/20056* (2013.01); *G06T 2207/30121* (2013.01)
USPC ........................................... 382/167; 382/254

(58) Field of Classification Search
None
See application file for complete search history.

(56) References Cited

U.S. PATENT DOCUMENTS

2005/0104908 A1*  5/2005  Brown Elliott ............... 345/694
2006/0092440 A1*  5/2006  Bagai ............................ 358/1.9
(Continued)

OTHER PUBLICATIONS

Mannos, James, and David J. Sakrison. "The effects of a visual fidelity criterion of the encoding of images." Information Theory, IEEE Transactions on 20.4 (1974): 525-536.*

(Continued)

*Primary Examiner* — Li Liu
(74) *Attorney, Agent, or Firm* — Andrew C. Cheng (57) ABSTRACT

The present invention discloses a method for establishing an evaluation standard parameter and method for evaluating the quality of a display image, wherein, the method comprises: taking pictures to a group of test images having different color shift severity degrees to obtain a sample picture group; selecting a standard picture by human eye; applying the Fourier transform for the brightness of the pictures of the sample picture group; applying convolution to the frequency distribution function and a contrast sensitivity function of human eye in the frequency domain; normalizing to the convolution function to obtain an evaluation parameter; selecting the evaluation parameter of the standard picture from the evaluation parameters of all the pictures of the sample picture group as an evaluation standard parameter. The present invention can obtain more objective and systemic evaluation standard parameter.

10 Claims, 4 Drawing Sheets

(56) References Cited

U.S. PATENT DOCUMENTS

| | | |
|---|---|---|
| 2006/0262147 A1* | 11/2006 | Kimpe et al. ........... 345/690 |
| 2008/0129732 A1* | 6/2008 | Johnson et al. ......... 345/424 |
| 2010/0284624 A1* | 11/2010 | Ninassi et al. .......... 382/224 |
| 2012/0154626 A1* | 6/2012 | Hatakeyama et al. ... 348/223.1 |

OTHER PUBLICATIONS

Young, Ian T., Jan J. Gerbrands, and Lucas J. Van Vliet. Fundamentals of image processing. Delft, The Netherlands: Delft University of Technology, 1998.*

Le Callet, Patrick, and Dominique Barba. "A robust quality metric for color image quality assessment." Image Processing, 2003. ICIP 2003. Proceedings. 2003 International Conference on. vol. 1. IEEE, 2003.*

Huang, Kai-Qi, Qiao Wang, and Zhen-Yang Wu. "Natural color image enhancement and evaluation algorithm based on human visual system." Computer Vision and Image Understanding 103.1 (2006): 52-63.*

Wang, Zhou, et al. "Image quality assessment: from error visibility to structural similarity." Image Processing, IEEE Transactions on 13.4 (2004): 600-612.*

* cited by examiner

METHOD FOR ESTABLISHING AN EVALUATION STANDARD PARAMETER AND METHOD FOR EVALUATING THE QUALITY OF A DISPLAY IMAGE

BACKGROUND OF THE INVENTION

1. Field of the Invention

The present invention relates to the field of image processing, and more particularly relates to a method for establishing an evaluation standard parameter and method for evaluating the quality of a display image.

2. Description of Related Art

Display as the friendly interface of human-computer exchange of information can output in formation accurately, intuitively, and clearly. When the display is sold as an electronic product, the quality of the display image becomes one of the important buying determinants of consumers. The image quality is determined by the brightness, the color shift, the clarity, and other relevant parameters. Therefore, the evaluation of the quality of the display image is important to be considered in the contents of the display development and design. Because the information of the display can be observed directly by the human eye, and its evaluation standards are different for different environments and applications. In recent years, with the rapid increase in the number and diversity of the various display technologies, it increases the requirements for the quality of the display image.

In the prior art, the evaluation the quality of the image uses JND criteria (Just Noticeable Difference). It requires to use a visual perception experiment based on the psychophysical method to determine a JND critical image, specifically as follows: displaying simultaneously two images in parallel on the monitor each time, wherein one is for an original image and the other is a test image. An observer requires selecting the image that the observer think that the color shifts are obvious in the two images. At first, the color shift difference between the test image and the original image is very large. The observer can easily distinguish the two images. If the selection is correct, it reduces the color shift difference, between a next test image and the original image. If the selection is wrong, it increases the color shift difference between a next test image and the original image. Repeat the above process. When the color shift difference meets certain condition, the corresponding test image is the JND critical image. For evaluating a subsequent image, it is the reference base.

However, because the different technical proficiency of the observer, the results of the above evaluations by human eye of the observer maybe different. Even if it is evaluated by the same observer, because of the actual state, the different time, the viewing angle of the display, observed from different light conditions, it leads to that the subjectivity will enter the evaluation resulting in the inconsistency of the evaluation. In addition, the level of awareness of the severity degree of the color shift in the display by the observer will change with different image brightness and ambient light conditions.

As stated above, because the evaluation involves the subjectivity, it is difficult to give an objective and fair evaluation in display design, development and consumer.

SUMMARY OF THE INVENTION

The technical problem solved by the present invention is to provide a method for establishing evaluation standard parameters and method for evaluating the quality of a display image to replace the observation of human eye by the evaluation standard parameter.

In order to solve the above-mentioned technical problem, a technical solution provided by the present invention is: a method for establishing an evaluation standard parameter, the evaluation standard parameter for evaluating the quality of a display image, the quality of the image being inversely proportional to the severity degree of the color shift phenomenon of the image, the method comprising: taking pictures to a group of test images having different color shift severity degrees to obtain a sample picture group, and selecting a standard picture from the sample picture group by human eye; applying the Fourier transform for the brightness of the pictures of the sample picture group to obtain a frequency distribution function, wherein the frequency distribution function is expressed by:

$F(\omega)=F[f(t)]=\int_{-\infty}^{\infty} f(t)e^{-i\omega t}dt$, wherein, $F(\omega)$ is the frequency distribution function;

F is the operator for the Fourier transform, and f(t) is a function for the brightness; filtering the frequency distribution function to filter the noise; applying convolution to the frequency distribution function and a contrast sensitivity function of human eye in the frequency domain to obtain a convolution function, wherein, the contrast sensitivity function of human eye is expressed as:

$CSF(\omega)=2.6\times(0.0192+0.114\times\omega)\times e^{(-0.114\times\omega)^{1.1}}$ and the convolution functions is expressed as: $H(\omega)=\int_{-\infty}^{\infty} F(\omega)CSF(k-\omega)d\omega$, wherein, $CSF(\omega)$ is the contrast. sensitivity function of human eye; $\omega=\sqrt{\omega_x^2+\omega_y^2}$ is the spatial frequency and it's unit is cycle/degree; $\omega_x$ and $\omega_x$ are the horizontal direction and the vertical direction spatial frequency; $H(\omega)$ is the convolution functions; k is an offset value; the integral range is $-\infty \square \infty$; normalizing to the convolution function to obtain an evaluation parameter, wherein, the evaluation parameter is expressed as:

$$\text{Factor} = \frac{H(\omega)}{F(\omega)},$$

wherein, Factor is the evaluation parameter; and selecting the evaluation parameter of the standard picture from the evaluation parameters of all the pictures of the sample picture group as an evaluation standard parameter.

Wherein, the step of normalizing to the convolution function to obtain an evaluation parameter specifically includes: proceeding center translation of an origin of the convolution function, calculating an absolute value of the convolution function at the origin, calculating a sum of the absolute values of the function of all variables corresponding to the frequency distribution function, and calculating the ratio of the absolute value of the function to the sum of the absolute values of the function.

Wherein, before calculating the ratio of the absolute value of the function to the sum of the absolute values of the function, excluding the value of the function of the frequency distribution function at the origin.

In order to solve the above-mentioned technical problem, another technical solution provided by the present invention is: A method for establishing an evaluation standard parameter, the evaluation standard parameter for evaluating the quality of a display image, the quality of the image being inversely proportional to the severity degree of the color shift phenomenon of the image, the method comprising: taking pictures to a group of test images having different color shift severity degrees to obtain a sample picture group, and selecting a standard picture from the sample picture group by human eye; applying the Fourier transform for the brightness of the pictures of the sample picture group to obtain a frequency distribution function; applying convolution to the frequency distribution function and a contrast sensitivity function of human eye in the frequency domain to obtain a convolution function; normalizing to the convolution function to obtain an evaluation parameter; and selecting the evaluation parameter of the standard picture from the evaluation parameters of all the pictures of the sample picture group as an evaluation standard parameter.

Wherein, before the step of applying convolution to the frequency distribution function and a contrast sensitivity function of human eye in the frequency domain, filtering, the frequency distribution function to filter the noise.

Wherein, the frequency distribution function is expressed as:

$F(\omega) = F[f(t)] = \int_{-\infty}^{\infty} f(t)e^{-i\omega t}dt$, wherein, $F(\omega)$ is the frequency distribution function;

F is the operator for the Fourier transform, and f(t) is a function for the brightness.

Wherein, the contrast sensitivity function of human eye is expressed as:

$$CSF(\omega) = 2.6 \times (0.0192 + 0.114 \times \omega) \times e^{(-0.114 \times \omega)^{1.1}}$$

wherein, $CSF(\omega)$ is the contrast sensitivity function of human eye;

$\omega = \sqrt{\omega_x^2 + \omega_y^2}$ is the spatial frequency and its unit is cycle/degree; $\omega_x$ and $\omega_y$ are the horizontal direction and the vertical direction spatial frequency.

Wherein, the convolution function is expressed as:
$H(\omega) = \int_{-\infty}^{\infty} F(\omega)CSF(k-\omega)d\omega$, wherein, $H(\omega)$ is the convolution function; k is an offset value; the integral range is $-\infty \square \infty$.

Wherein, the step of normalizing to the convolution function to obtain an evaluation parameter specifically includes: proceeding center translation of an origin of each convolution function, calculating an absolute value of the convolution function at the origin, calculating a sum of the absolute values of the function of all variables of the frequency distribution function, and calculating the ratio of the absolute value of the function to the sum of the absolute values of the function. Wherein, the all variables do not include the origin.

Wherein, before the step of calculating the ratio of the absolute value of the function to the sum of the absolute values of the function excluding the value of the function of the frequency distribution function at the origin from the sum of the absolute values of the function.

Wherein, the evaluation parameter is expressed as:

$$\text{Factor} = \frac{H(\omega)}{F(\omega)},$$

wherein, Factor is the evaluation parameter.

In order to solve the above-mentioned technical problem, another technical solution provided by the present invention is: A method for evaluating the quality of a display image, wherein, the method uses the evaluation standard parameters as claimed in claim 4, the method comprising: taking a picture to a display image to obtain a picture; applying the Fourier transform for the brightness of the picture to obtain a frequency distribution function; applying convolution to the frequency distribution function and a contrast sensitivity function of human eye in the frequency domain to obtain a convolution function; normalizing to the convolution function to obtain an evaluation parameter; and judging if the evaluation parameter is greater than the evaluation standard parameter, and if the result is right, determining that the quality of the image is failed.

Wherein, the step of normalizing to the convolution function specifically includes: proceeding center translation of an origin of each convolution function, calculating an absolute value of the convolution function at the origin, calculating a sum of the absolute values of the function of all variables of the frequency distribution function, and calculating the ratio of the absolute value of the function to the sum of the absolute values of the function, wherein, the all variables do not include the origin.

In summary, the method for establishing an evaluation standard parameter and method for evaluating the quality of a display image of the present invention by applying the Fourier transform to the brightness of the picture of the image; then, applying convolution to the frequency distribution function and a contrast sensitivity function of human eye; normalizing to the convolution functions and selecting the evaluation parameter of the standard picture as an evaluation standard parameter. The present invention can obtain more objective and systemic evaluation standard parameter to improve the objectivity of the image evaluation and to help the design and the development of the display system.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the skilled persons of ordinary skill in the art without creative effort, it can also obtain other figures according to these figures.

DETAILED DESCRIPTION OF THE PREFERRED EMBODIMENT

The following content combines with the drawings and the embodiment for describing the present invention detail.

Figure 1:
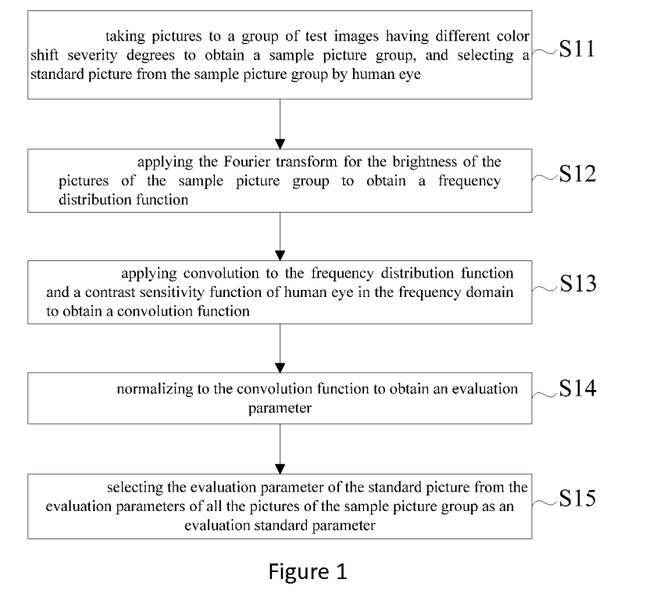
FIG. 1 is a flow chart of method for establishing an evaluation standard parameter according to a first embodiment of the present invention.

With reference to FIG. 1, FIG. 1 is a flow chart of method for establishing an evaluation standard parameter according to a first embodiment of the present invention. The evaluation standard parameter is for evaluating the quality of a display image. In the present invention, the mura (also known as the bright spots) phenomenon, and the bright-dark unevenness (also known as the hotspot) phenomenon can be directly observed by the human eye. The quality of the display image is inversely proportional to the degree of the bright spots and bright-dark unevenness of the display image. The method for establishing the evaluation standard parameters comprising the following steps:

Step S11: taking pictures to a group of test images having different color shift severity degrees to obtain a sample picture group, and selecting a standard picture from the sample picture group by human eye.

Wherein, the severity degrees of the group of test images are arbitrarily distributed. In the process of development and design of the display, it obtains the group of test images that distributed arbitrary in severity degrees by artificial design. The present invention does not limit the number of the test images, and the number of the test images may be selected according to the actual testing requirement.

The group of test images is taken pictures by charge-coupled device (CCD). Each of the test images gets a picture, and after completion of taking pictures, it obtains the sample picture group.

The existing display and coding technology cannot make sure that the quality of an image is perfect. There are always unsatisfactory defects. Because the various technical parameters that affect the quality of the final image exist interaction and the costs to improve the various technical parameters are also different, and the costs are the problems that must be considered in the actual production. Improving, the quality of the image in the development and design requires considering various factors of weight and compromise. It is considered that the quality of the image on a display is judging by the consumer through the human eye directly and the human eye has a limited capacity on the severity degree of an image. Some images exist certain of severity degree, but the human eye cannot detect so that it can be judged that the quality of the image is acceptable. Therefore, in the present embodiment, it selects a picture as the standard picture by the human eye and the severity degree of the standard picture almost does not affect the quality of the image such that it can be accepted by the human eye.

Step S12: applying the Fourier transform for the brightness of the pictures of the sample picture group to obtain a frequency distribution function.

Wherein, a picture can be considered to be composed of pixels including, the pixel of N rows and M columns, wherein, the N and the M are positive integers. The Fourier transform for the brightness is applying the Fourier transform to the brightness of each pixel in order to obtain the spectral value of each pixel, and these spectral values can be obtained from the frequency distribution function.

Step S13: applying convolution to the frequency distribution function and a contrast sensitivity function of human eye in the frequency domain to obtain a convolution function.

Figure 2:
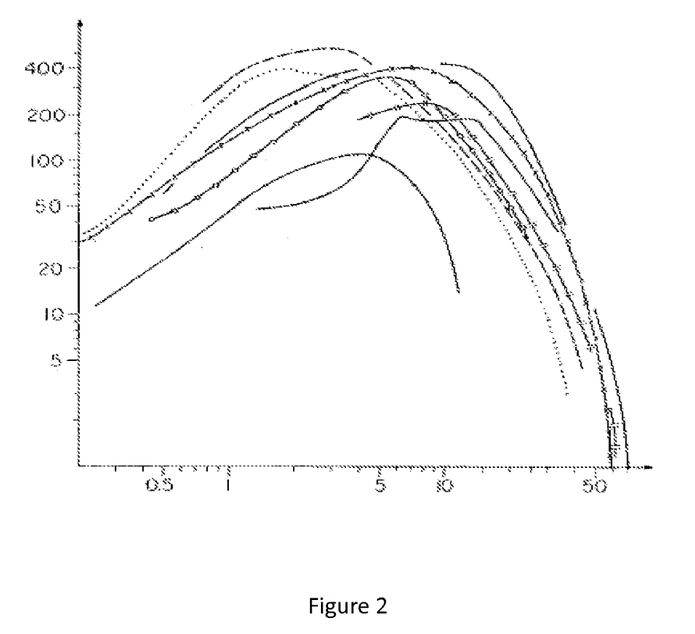
FIG. 2 is a schematic diagram of curves of a contrast sensitivity function of human eye.

Wherein, the contrast sensitivity function (CSF) of human eye is a function that is the reciprocal of the detection contrast threshold (referred to as a visual acuity) changing with the spatial frequency of stimulation. The data of the CSF or human eye are obtained by experimental measurements of human visual psychophysics. For example, with reference to FIG. 2, FIG. 2 is a schematic diagram of curves of a contrast sensitivity function of human eye. In FIG. 2, the horizontal axis represents the spatial frequency, and the vertical axis represents the visual acuity. There are some curves in FIG. 2, and they are experience curves obtained after some experiments from the Former science and technology workers and closed each other.

After applying convolution to the frequency distribution function and the contrast sensitivity function (CSF) of human eye, it obtains the convolution function. Each spectral value changes correspondingly, that is, re-obtaining a group of spectral values of N row and M column, and these spectral values can be obtained from the convolution function.

Step S14: normalizing to the convolution function to obtain an evaluation parameter.

Wherein, after the normalization, the spectral values corresponding to the convolution function become dimensionless, and the evaluation parameters represent the relative value of the spectral values corresponding to the convolution. function to the spectral values corresponding to the frequency distribution function.

Step S15: selecting the evaluation parameter of the standard picture from the evaluation parameters of all the pictures of the sample picture group as an evaluation standard parameter.

Wherein, after obtaining all of the evaluation parameters, it can directly obtain. the difference between the evaluation parameter of the standard picture and other evaluation parameters in order to judge if the selection of the standard picture has the representation and reference.

If it exist larger error at the selection of the reference of the evaluation parameter of the standard picture, it repeats step S11 to re-select a standard picture.

Figure 3:
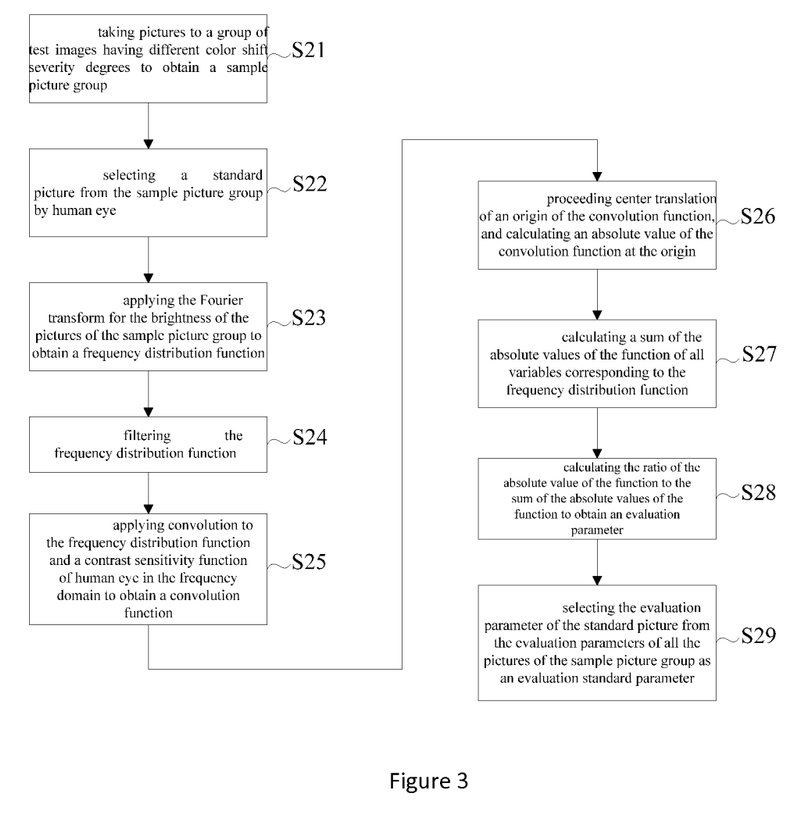
FIG. 3 is a flow chart of a method for establishing an evaluation standard parameter according to a second embodiment of the present invention.

With reference to FIG. 3, FIG. 3 is a flow chart of a method for establishing an evaluation standard parameter according to a second embodiment of the present invention. The method comprises the following steps:

Step S21: taking pictures to a group of test images having different color shift severity degrees to obtain a sample picture group.

Step S22: selecting a standard picture from the sample picture group by human eye.

Wherein the steps S21 and S22 can refer to the foregoing embodiment, and it does not repeat here.

Step S23: applying the Fourier transform for the brightness of the pictures of the sample picture group to obtain a frequency distribution function.

Wherein the frequency distribution function is expressed by:

$$F(\omega)=F[f(t)]=\int_{-\infty}^{\infty}f(t)e^{-i\omega t}dt$$

Wherein $F(\omega)$ is the frequency distribution function; F is the operator for the Fourier transform, and f(t) is a function for the brightness.

Step S24: filtering the frequency distribution function.

Wherein, the filtering can filter the noise. In the present embodiment, it applies mean filtering to the frequency distribution function.

Step S25: applying convolution to the frequency distribution function and a contrast sensitivity function of human eve in the frequency domain to obtain a convolution function.

Wherein, the contrast sensitivity function of human eye is expressed as:

$$CSF(\omega)=2.6\times(0.0192+0.114\times\omega)\times e^{(-0.114\times\omega)^{1.1}}$$

$CSF(\omega)$ is the contrast sensitivity function of human eye; $\omega=\sqrt{\omega_x^2+\omega_y^2}$ is the spatial frequency and its unit is cycle/degree; $\omega_x$ and $\omega_x$ are the horizontal direction and the vertical direction spatial frequency; The spatial frequency means the number of the periodicity change of the brightness (i.e., gray) in an unit length.

The convolution function is expressed as:

$$H(\omega)=\int_{-\infty}^{\infty}F(\omega)CSF(k-\omega)d\omega$$

Wherein, $H(\omega)$ is the convolution functions: k is an offset value; the integral range is $-\infty\square\infty$.

Step S26: proceeding center translation of an origin of the convolution function, and calculating an absolute value of the convolution function at the origin.

Wherein, the step of proceeding center translation of an origin of the convolution function means translating the center of the convolution function to the origin of the coordinate, that is, translating the spectrum curve corresponding to the convolution function to the origin of the coordinate. At the origin of the coordinate, the absolute value of the spectral value is maximal, and the absolute value of the maximal spectral value is the absolute value of the function.

Step S27: calculating a sum of the absolute values of the function of all variables corresponding to the frequency distribution function.

Wherein, the sum of the absolute values of the function means a sum of the absolute values of the spectral values corresponding to each pixel.

Step S28: calculating the ratio of the absolute value of the function to the sum of the absolute values of the function to obtain an evaluation parameter.

Wherein, in the present embodiment, in the calculation, the sum of the absolute values of the function does not includes the absolute value of the spectral value at the origin, that is, the sum of the absolute value of the function excludes the value of the function of the frequency distribution function at the origin.

The evaluation parameter is expressed as:

$$\text{Factor} = \frac{H(\omega)}{F(\omega)}$$

Figure 4:
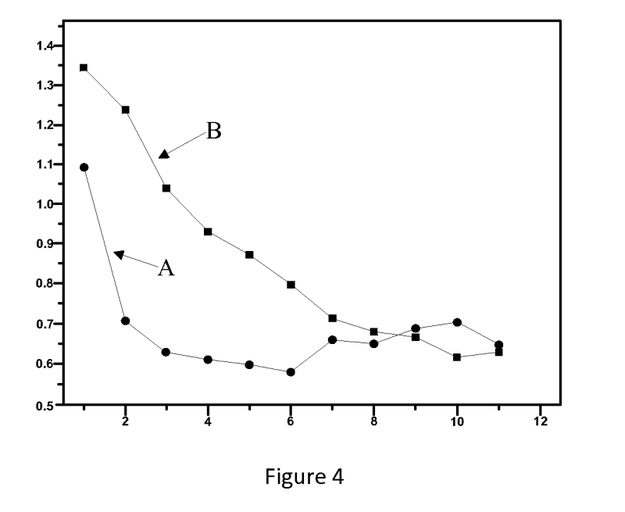
FIG. 4 is a schematic diagram of the distribution of the evaluation parameters of all the pictures in the method shown in FIG. 3.

Wherein, Factor is the evaluation parameter, and the evaluation parameter represents the quality of an image. For example, with reference to FIG. 4, FIG. 4 is a schematic diagram of the distribution of the evaluation parameters of all the pictures in the method shown in FIG. 3. In FIG. 4, the horizontal axis indicates the series number of the pictures in the sample picture group, and the vertical axis indicates the evaluation parameters. The curve A represents a series of the evaluation parameters corresponding to a group of test images having the size of the 1400×400. The curve B represents a series of the evaluation parameters corresponding to a group of test Images having the size of the 2000×200.

Step S29: selecting the evaluation parameter of the standard picture from the evaluation parameters of all the pictures of the sample picture group as an evaluation standard parameter.

Wherein, when it is assumed that in the step S22, the series number of the standard picture is 11, the evaluation standard parameter is approximately equal to 0.65.

Through the method for establishing the evaluation standard parameter of the present embodiment, the subjectivity evaluation criterion becomes the objective evaluation parameter. It is helpful for the development, design, testing, or production by using the evaluation standard parameter for evaluating the display image.

Figure 5:
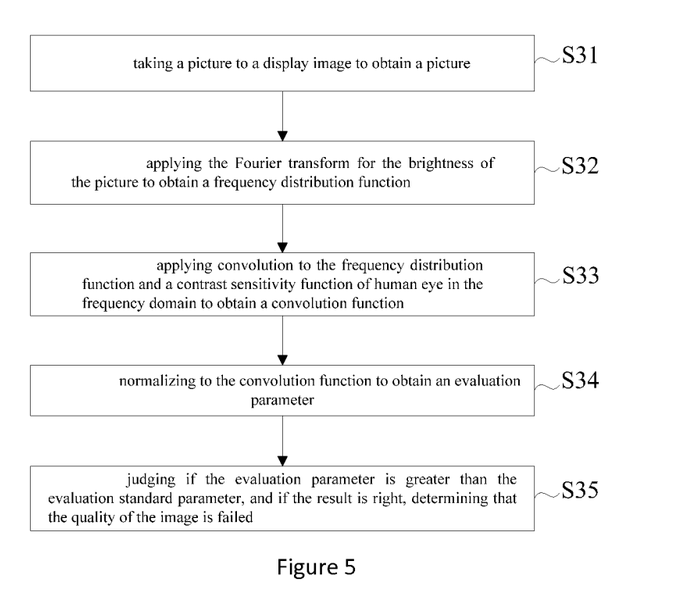
FIG. 5 is a flow chart of a method for evaluating the quality of a display image according to the embodiment of the present invention.

With reference to FIG. 5, FIG. 5 is a flow chart of a method for evaluating the quality of a display image according to the embodiment of the present invention. The method for evaluating of the present embodiment uses the evaluation standard parameters obtained by the method of the foregoing embodiment. The method comprises the following steps:

Step S31: taking a picture to a display image to obtain a picture.

Step S32: applying the Fourier transform for the brightness of the picture to obtain a frequency distribution function.

Step S33: applying convolution to the frequency distribution function and a contrast sensitivity function of human eye in the frequency domain to obtain a convolution function.

Wherein, the steps S31, S32 and S33 can refer to the related steps of the foregoing embodiment, it does not repeat here.

Step S34: normalizing to the convolution function to obtain an evaluation parameter.

Wherein, step S34 specifically includes: proceeding center translation of an origin of each convolution function, calculating an absolute value of the convolution function at the origin, calculating a sum of the absolute values of the function of all variables of the frequency distribution function, and calculating the ratio of the absolute value of the function to the sum of the absolute values of the function. Wherein, the all variables do not include the origin.

Step S35: judging if the evaluation parameter is greater than the evaluation standard parameter, and if the result is right, determining that the quality of the image is failed.

Wherein, with combined reference to FIG. 4, if the evaluation parameter is greater than 0.65, the quality of the image is unsatisfactory. If the evaluation parameter is less than or equal to 0.65, it indicates that the mural hotspot phenomenon can be accepted by the human eye, the quality of the image is acceptable.

By the above-described method, the method for establishing the evaluation standard parameters of the present invention and method for evaluating the quality of the display image through the establishment of the evaluation standard parameters. Then, processing evaluation by comparing evaluation parameters of arbitrary images with the evaluation standard parameters such that the evaluation process is more objective to reduce participation of the human eve in the evaluation process and to contribute to the design and development of the display system.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

The above embodiments of the present invention are not used to limit the claims of this invention. Any use of the content in the specification or in the drawings of the present invention which produces equivalent structures or equivalent processes or directly or indirectly used in other related technical fields is still covered by the claims in the present invention.

What is claimed is:

1. A method for establishing an evaluation standard parameter, the evaluation standard parameter for evaluating the quality of a display image, the quality of the image being inversely proportional to the severity degree of the color shift phenomenon of the image, the method comprising:

taking pictures to a group of test images having different color shift severity degrees to obtain a sample picture group, and selecting a standard picture from the sample picture group by human eye, wherein each of the pictures includes multiple pixels;

applying the Fourier transform for the brightness of the pictures of the sample picture group to obtain a frequency distribution function, wherein the frequency distribution function is expressed by: $F(\omega)=F[f(t)]=\int_{-\infty}^{\infty} f(t)e^{-i\omega t}dt$ , wherein, $F(\omega)$ is the frequency distribution function; F is the operator for the Fourier transform, and f(t) is a function for the brightness; and the frequency distribution function has multiple values and each value of the frequency distribution function corresponds to one of the multiple pixels;

filtering the frequency distribution function to filter the noise;

applying convolution to the frequency distribution function and a contrast sensitivity function of human eye in the frequency domain to obtain a convolution function, wherein, the contrast sensitivity function of human eye is expressed as:

$CSF(\omega)=2.6\times(0.0192+0.114\times\omega)\times e^{(-0.114\omega)^{1.1}}$ and the convolution functions is expressed as: $H(\omega)=\int_{-\infty}^{\infty} F(\omega)CSF(k-\omega)d\omega$, wherein, $CSF(\omega)$ is the contrast sensitivity function of human eye; $\omega=\sqrt{\omega_{x2}+\omega_{y2}}$ is the spatial frequency and it's unit is cycle/degree; $\omega_x$ and $\omega_x$ are the horizontal direction and the vertical direction spatial frequency; $H(\omega)$ is the convolution functions; k is an offset value; the integral range is $-\infty:\infty$;

normalizing to the convolution function to obtain an evaluation parameter, wherein, the evaluation parameter is expressed as:

$$Factor = \frac{H(\omega)}{F(\omega)},$$

wherein, Factor is the evaluation parameter; and wherein the ste of normalizin to the convolution function to obtain an evaluation arameter s ecificall includes: roceedin a center translation of an origin of the convolution function; calculating an absolute value of the convolution function at the origin; calculating a sum of absolute values of the frequency distribution function corresponding to the multiple pixels; and calculating a ratio of the absolute value of the convolution function at the origin to the sum of absolute values of the frequency distribution function corresponding to the multiple pixels; and selecting the evaluation parameter of the standard picture from the evaluation parameters of all the pictures of the sample picture group as an evaluation standard parameter.

2. The method according to claim 1, wherein, before calculating the ratio of the absolute value of the convolution function at the origin to the sum of the absolute values of the frequency distribution function corresponding to the multiple pixels, excluding the value of the frequency distribution function at the origin from the sum of the absolute values of the frequency distribution function corresponding to the multiple pixels.

3. A method for establishing an evaluation standard parameter, the evaluation standard parameter for evaluating the quality of a display image, the quality of the image being inversely proportional to the severity degree of the color shift phenomenon of the image, the method comprising:

taking pictures to a group of test images having different color shift severity degrees to obtain a sample picture group, and selecting a standard picture from the sample picture group by human eye, wherein each of the pictures includes multiple pixels;

applying the Fourier transform for the brightness of the pictures of the sample picture group to obtain a frequency distribution function; wherein, the frequency distribution function has multiple values and each value of the frequency distribution function corresponds to one of the multiple pixels;

applying convolution to the frequency distribution function and a contrast sensitivity function of human eye in the frequency domain to obtain a convolution function;

normalizing to the convolution function to obtain an evaluation parameter; and wherein, the step of normalizing to the convolution function to obtain an evaluation parameter specifically includes: proceedin a center translation of an origin in of the convolution function; calculatin an absolute value of the convolution function at the origin; calculating a sum of absolute values of the frequency distribution function corresponding to the multiple pixels; and calculatin a ratio of the absolute value of the convolution function at the origin to the sum of absolute values of the frequency distribution function corresponding to the multiple pixels; and selecting the evaluation parameter of the standard picture from the evaluation parameters of all the pictures of the sample picture group as an evaluation standard parameter.

4. The method according to claim 3, wherein, before the step of applying convolution to the frequency distribution function and a contrast sensitivity function of human eye in the frequency domain, filtering the frequency, distribution function to filter the noise.

5. The method according to claim 3, wherein, the frequency distribution function is expressed as: $F(\omega)=F[f(t)]=\int_{-\infty}^{\infty} f(t)e^{-i\omega t}dt$, wherein, $F(\omega)$ is the frequency distribution function; F is the operator for the Fourier transform, and f(t) is a function for the brightness.

6. The method according to claim 5, wherein, the contrast sensitivity function of human eye is expressed as:

$CSF(\omega)=2.6\times(0.0192+0.114\times\omega)\times e^{(-0.114\times\omega)^{1.1}}$ wherein, $CSF(\omega)$ is the contrast sensitivity function of human eye; $\omega=\sqrt{\omega_{x2}+\omega_{y2}}$ is the spatial frequency and its unit is cycle/degree; $\omega_x$ and $\omega_y$ are the horizontal direction and the vertical direction spatial frequency.

7. The method according to claim 6, wherein, the convolution function is expressed as:

$H(\omega)=\int_{-\infty}^{\infty} F(\omega)CSF(k-\omega)d\omega$, wherein, $H(\omega)$ is the convolution function; k is an offset value;

the integral range is $-\infty:\infty$.

8. The method according to claim 3, wherein, before the step of calculating the ratio of the absolute value of the convolution function at the origin to the sum of the absolute values of the frequency distribution function corresponding to the multiple pixels, excluding the value of the function of the frequency distribution function at the origin from the sum of the absolute values of the frequency distribution function corresponding to the multiple pixels.

9. The method according to claim 4, wherein, the evaluation parameter is expressed as:

$$Factor = \frac{H(\omega)}{F(\omega)}$$

wherein, Factor is the evaluation parameter.

10. A method for evaluating the quality of a display image, wherein, the method uses the evaluation standard parameters as claimed in claim 5, the method comprising:

taking a picture to a display image to obtain a picture, wherein each of the pictures includes multiple pixels;

applying the Fourier transform for the brightness of the picture to obtain a frequency distribution function; wherein, the frequency distribution function has multiple values and each value of the frequency distribution function corresponds to one of the multiple pixels;

applying convolution to the frequency distribution function and a contrast sensitivity function of human eye in the frequency domain to obtain a convolution function;

normalizing to the convolution function to obtain an evaluation parameter; and wherein, the step of normalizing to the convolution function to obtain an evaluation parameter specifically includes: proceeding a center translation of an origin of the convolution function; calculating an absolute value of the convolution function at the origin; calculating a sum of absolute values of the frequency distribution function corresponding to the multiple pixels; and calculating a ratio of the absolute value of the convolution function at the origin to the sum of absolute values of the frequency distribution function corresponding to the multiple pixels; and judging if the evaluation parameter is greater than the evaluation standard parameter, and if the result is right, determining that the quality of the image is failed.

* * * * *